(12) United States Patent
Winkler et al.

(10) Patent No.: US 8,612,151 B2
(45) Date of Patent: Dec. 17, 2013

(54) APPARATUS FOR AND METHOD OF JUNCTION VIEW DISPLAY

(76) Inventors: Marcus Winkler, Hannover (DE); Krzysztof Miksa, Lodz (PL)

( * ) Notice: Subject to any disclaimer, the term of this patent is extended or adjusted under 35 U.S.C. 154(b) by 433 days.

(21) Appl. No.: 12/736,764

(22) PCT Filed: Jul. 11, 2008

(86) PCT No.: PCT/NL2008/050471
§ 371 (c)(1),
(2), (4) Date: Dec. 14, 2010

(87) PCT Pub. No.: WO2010/005285
PCT Pub. Date: Jan. 14, 2010

(65) Prior Publication Data
US 2011/0112756 A1    May 12, 2011

(51) Int. Cl.
*G01C 21/36*    (2006.01)
(52) U.S. Cl.
USPC .................................... 701/533; 340/995.2
(58) Field of Classification Search
USPC ............... 701/533, 532, 437, 314; 340/995.2, 340/995.24
See application file for complete search history.

(56) References Cited

U.S. PATENT DOCUMENTS

| | | | |
|---|---|---|---|
| 5,925,090 A * | 7/1999 | Poonsaengsathit | 701/440 |
| 6,199,014 B1 | 3/2001 | Walker et al. | |
| 6,360,168 B1 | 3/2002 | Shimabara | |
| 6,671,615 B1 * | 12/2003 | Becker et al. | 701/516 |
| 2005/0273256 A1 | 12/2005 | Takahashi | |
| 2006/0287819 A1 * | 12/2006 | Brulle-Drews et al. | 701/211 |
| 2007/0055441 A1 | 3/2007 | Retterath et al. | |
| 2008/0218379 A1 * | 9/2008 | Boss et al. | 340/905 |
| 2008/0312827 A1 * | 12/2008 | Kahlow et al. | 701/209 |
| 2009/0187335 A1 * | 7/2009 | Muhlfelder et al. | 701/200 |
| 2009/0326814 A1 * | 12/2009 | Harumoto et al. | 701/210 |

FOREIGN PATENT DOCUMENTS

| | | |
|---|---|---|
| CN | 101111878 A | 1/2008 |
| CN | 101135565 A | 3/2008 |
| EP | 1 681 537 | 7/2006 |
| EP | 1 681 538 | 7/2006 |
| JP | 2008-122150 | 5/2008 |

OTHER PUBLICATIONS

International Preliminary Report on Patentability dated Jan. 11, 2011.
International Search Report, Jun. 4, 2009.

* cited by examiner

*Primary Examiner* — Marthe Marc-Coleman

(57) ABSTRACT

A navigation method and navigation system are disclosed. In at least one embodiment, the method has the following actions: a.) receiving position data from a position determining device; b.) when approaching a junction with the navigation system, displaying the junction view on a display, the junction view showing data as to a real-life view of the junction inclusive of an image of each signpost present on the junction as visible to a user of the navigation system; c.) receiving route information from route planning software indicating a route to be followed by the user; and d.) highlighting on the display a signpost related to a road segment to be followed by the user relative to all other signposts as shown on the display.

17 Claims, 8 Drawing Sheets

APPARATUS FOR AND METHOD OF JUNCTION VIEW DISPLAY

FIELD OF THE INVENTION

The present invention relates to the field of displaying junction views in a navigation system.

PRIOR ART

In the current field of Personal Navigation Systems (PNAV) like dedicated handheld navigation systems, Personal Digital Assistants (PDAs) and mobile telephones provided with a navigation module, as well as in the in-car navigation market, end-user needs are already commonly addressed by applications. Vendors differentiate by adding additional functions and features to navigation (and ADAS systems). Examples include speed camera information, traffic information etc. as well as, Junction Views: Junction view is a feature that improves guidance and user understanding of crossings, bifurcations or junctions. Such additional features of navigation systems may assist the user in taking the correct decisions when travelling from a starting location to a destination. This application deals with displaying junction views on the display of a navigation system.

One approach is to display a junction of, for instance, a highway on the display of the navigation system in the car together with all lanes and signposts as are present in reality. Superimposed on or in addition to such a real or animated view are one or more arrows indicating the route to be followed by the driver to his destination and as calculated by the navigation system. Reference is, e.g., made to EP-A-1,681,537 and EP-A-1,681,538.

However in real life situations, the driver has to follow one of many arrows present on a signpost in the vicinity of a junction. In case of complex freeway intersections, multiple signposts related to different manoeuvres are located and the driver has to determine the correct one during a very quick comparison between reality as observed through the windscreen and the presentation of the application on the navigation system's display. When such a presentation comprises all such signposts, the time necessary for this comparison may be too long possibly resulting in a too low attention of the driver for the real life environment which may be dangerous.

Another approach taken by current vendors is displaying a limited number and/or content of signposts, in order to improve readability. It is focusing on arrow elements as the main help for the driver in addition to the voice command. In this approach, the driver has to abstract the real world information including all signposts as present in reality through his windscreen first before he can successfully match it to the displayed signposts. Again, the time necessary for this comparison may be too long possibly resulting in a too low attention of the driver for the real life environment. This may be dangerous too.

US2005/0273256A1 discloses a navigation system showing a junction view of a junction approached by a driver of a vehicle comprising the navigation system. The junction view as shown on the display of the navigation system shows traffic lights as seen by the driver through his windscreen when approaching the junction. The traffic light that needs to be considered by the driver in accordance with the route calculated by the navigation system is highlighted on the display.

BRIEF SUMMARY OF THE INVENTION

The objective of the invention is to provide a navigation system with a new user interface in which junction views in a navigation system are presented in such a way that a user needs less time and is more confident than in prior art systems to recognize the direction the user has to go in accordance with the route as calculated by the navigation system. Here, it is observed that the term "junction" refers to any kind of junction including all kinds of branches from a road and exits and entrances on a highway.

To that effect, the invention provides a navigation system as claimed in claim 1, a method as defined in claim 9, a computer program product as claimed in claim 10 and a data carrier with such a computer program product as claimed in claim 11.

So in accordance with the invention, all those signposts that are present in the real world at the junction are presented on the monitor with their full content. The signpost that matches the driving recommendation of the navigation system in accordance with a calculated route is emphasized over the other signposts. Thus, this new navigation system enables the driver to more quickly match the junction view on the display to the situation he/she sees on the road and, thus, to understand the intended manoeuvre. This is especially true in an embodiment where the user can correlate the spoken driving instruction as produced by the navigation system at a junction with the junction view displayed by the system. Besides enabling faster comprehension, the invention directs the driver to naturally focus on the proper sign within the context of all signs. Knowing what to look for gives the driver more confidence that the system matches the reality he sees out the windscreen.

This enhances the drivers ability to properly manoeuvre through the junction and reduces distraction and uncertainty which makes for a better and safer driving experience. This is especially true on highways where speeds of vehicles may be considerable and drivers have to take decisions in a split second. Due to the invention, the driver needs only a quick look at the navigation systems display and can, then, confidently pay his/her attention to the real road situation again.

BRIEF DESCRIPTION OF THE DRAWINGS

The invention will be explained in detail with reference to some drawings that are only intended to show embodiments of the invention and not to limit the scope. The scope of the invention is defined in the annexed claims and by its technical equivalents.

The drawings show.

DETAILED DESCRIPTION OF EMBODIMENTS

The present invention is applicable in all kinds of navigation systems: handheld devices, PDAs, and mobile telephones with navigation software and in-car navigation systems built in a vehicle. The invention can be implemented in any type of standard navigation system nowadays available on the market. In order to better understand the present invention, below, the application in one possible in-car navigation system will be further explained in detail. However, this does not exclude any other type of implementation, for instance, a handheld device.

Figure 1:
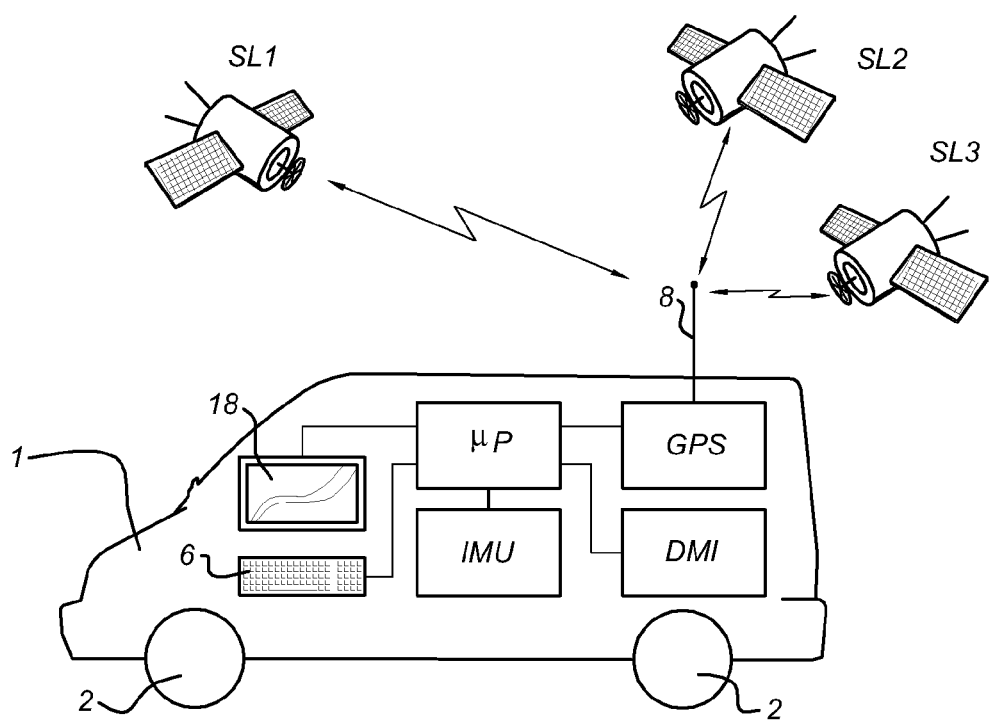
FIG. 1 shows a vehicle with a navigation system.
Figure 2:
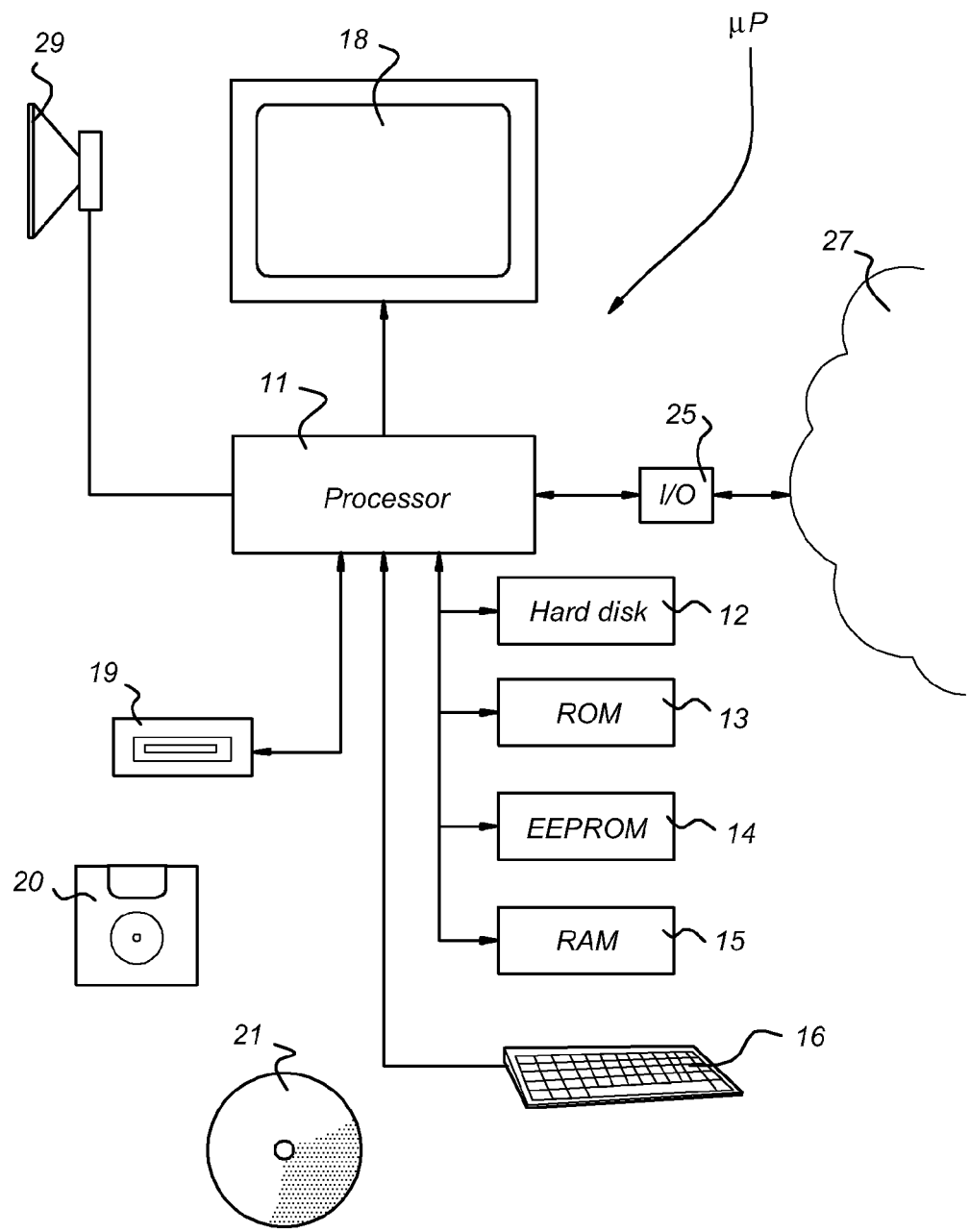
FIG. 2 shows a computer arrangement that can be used as the microprocessor of the navigation system of FIG. 1, FIGS. 3a and 3b show examples of displays according to the prior art.

FIG. 1 shows a vehicle provided with a navigation system. The vehicle 1 is provided with a plurality of wheels 2. Moreover, the vehicle 1 is provided with a navigation system. As shown in FIG. 1, the navigation system may comprise the following components:

a position determination device which may include a GPS (global positioning system) or other GNSS (Global Navigation Satellite System) unit connected to an antenna 8 and arranged to communicate with a plurality of satellites SLi (i=1, 2, 3, . . . ) and to calculate a position signal from signals received from the satellites SLi. The GPS system may also deliver heading data (i.e., direction of travel) and speed of the vehicle 1. The GPS system may be a DGPS system (differential GPS) or one augmented by WASS (Wide Area Augmentation System) providing an accuracy of 1 sigma/1 meter (apart from possible white noise). The GPS system is connected to a microprocessor μP that is arranged to process the GPS output signals.

a microprocessor μP connected to the GPS unit. Based on the signals received from the GPS system, the microprocessor μP determines suitable display signals to be displayed on a display 18 in the vehicle 1, informing the driver where the vehicle is located and possibly in what direction it is travelling. Moreover, in the context of the present invention, the microprocessor μP is programmed with route planning software to calculate a route for the driver of the vehicle from a starting location to a desired destination. Such a desired destination is, for instance, input by a driver via a keyboard 6 which is connected to the microprocessor μP. The keyboard 6 can also be used by the driver to ask the microprocessor μP to show other information as is known to persons skilled in the art. Instead of a keyboard 6 any alternative device used by the driver to communicate with the microprocessor μP can be used, like a touch screen or a voice convertor. The microprocessor generates suitable routing instructions for the driver that include both visual data shown on the display 18 and audible data via a speaker 29 (FIG. 2). Such route planning software is known from the prior art and does not need further clarification here. Below, only the features of such software necessary for the invention are clarified in detail.

As shown, in order to enhance the precision of the position determination, the position determination system may comprise a DMI (Distance Measurement Instrument). This instrument is an odometer that measures a distance travelled by the vehicle 1 by sensing the number of rotations of one or more of the wheels 2. The DMI may operate with a sampling frequency of 10 or more Hz. The DMI is also connected to the microprocessor μP to allow the microprocessor μP to take the distance as measured by the DMI into account while processing the output signals from the GPS unit. DMIs are not yet widely applied in in-car navigation systems but they may well be in the (near) future.

In a further embodiment, and to further enhance the precision of the position determination, the position determination system may comprise an IMU (Inertial Measurement Unit). Such an IMU can be implemented as three gyro units arranged to measure rotational accelerations and three accelerometers arranged to measure translational accelerations along three orthogonal directions. The IMU/gyros and accelerometers may operate with a sampling frequency of 200 Hz. The IMU is also connected to the microprocessor μP to allow the microprocessor μP to take the measurements by the IMU into account while processing the output signals from the GPS unit. Like DMIs, IMUs are not yet widely applied in in-car navigation systems but they may well be in the (near) future.

It will be understood by one skilled in the art that there are other navigational sensors that may be added or substituted to the suite described above to provide a position and heading determination at the performance/cost point desired.

The display 18 may be a so-called head-up display HUD. Examples of HUDs are: fixed HUDs and helmet mounted HUDs. Fixed HUDs may be used in vehicles and require the driver to look through a display element attached to the vehicle chassis. The navigation system determines the image to be presented depending solely on the orientation of the vehicle 1. Helmet mounted displays (HMD) are technically a form of HUD, the distinction being that they feature a display element that moves with the orientation of the user's head.

In FIG. 2, an overview is given of microprocessor μP that can be used in accordance with the invention. The microprocessor μP comprises a processor 11 for carrying out arithmetic operations.

The processor 11 is connected to a plurality of memory components, including a hard disk 12, Read Only Memory (ROM) 13, Electrically Erasable Programmable Read Only Memory (EEPROM) 14, and Random Access Memory (RAM) 15. Not all of these memory types need necessarily be provided.

The processor 11 is also connected to means for inputting instructions, data etc. by a user, like a keyboard 16, a touch screen and/or a voice converter.

A reading unit 19 connected to the processor 11 is provided. The reading unit 19 is arranged to read data from and possibly write data on a physical data carrier like a floppy disk 20 or a CDROM 21. Other data carriers may be tapes, DVD, CD-R. DVD-R, memory sticks etc. as is known to persons skilled in the art.

The processor 11 is connected to display 18, for instance, a monitor or LCD (Liquid Crystal Display) screen, or any other type of display known to persons skilled in the art. The processor 11 is also connected to speaker 29.

The processor 11 may be connected to a communication network 27 via a wireless connection, for instance, the Public Switched Telephone Network (PSTN), a Local Area Network (LAN), a Wide Area Network (WAN), the Internet etc. by means of I/O means 25. The processor 11 may be arranged to communicate with other communication arrangements through the network 27.

The physical data carrier 20, 21 may comprise a computer program product in the form of data and instructions arranged to provide the processor with the capacity to perform a method in accordance with the invention. However, such computer program product may, alternatively, be downloaded via the telecommunication network 27.

The processor 11 may be implemented as stand alone system, or as a plurality of parallel operating processors each arranged to carry out subtasks of a larger computer program, or as one or more main processors with several sub-processors.

Figure 3A:
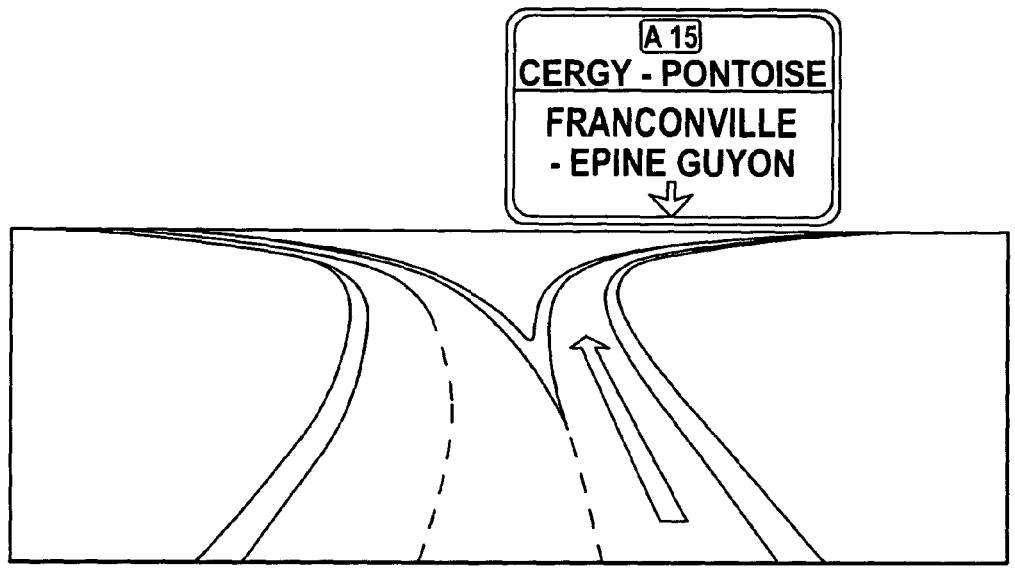
Figure 3B:
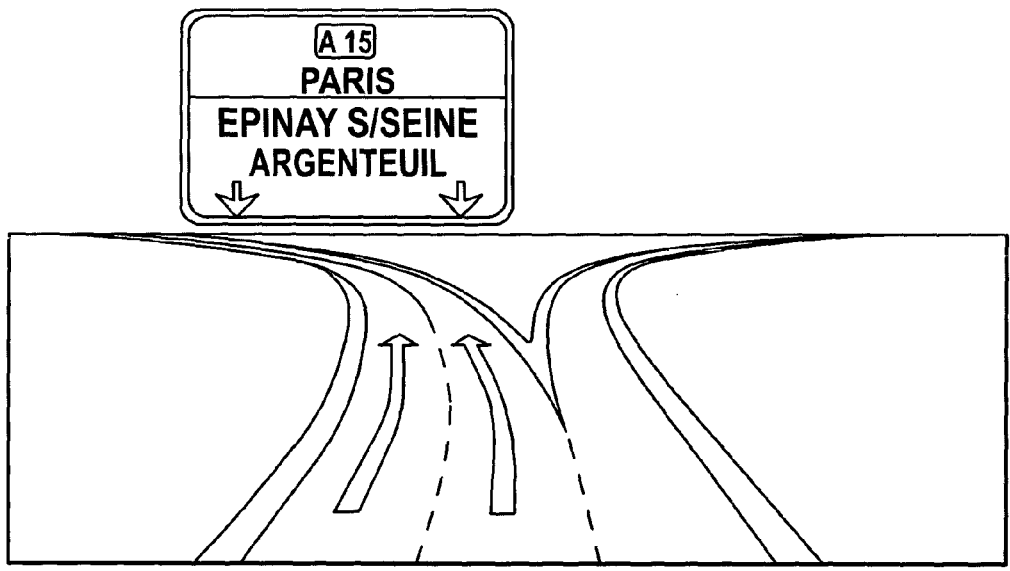

FIGS. 3a and 3b show the way some prior art navigation systems may present a junction view on a display to a user. In this example, the junction can be said to be a junction of three road segments: one road segment on which the driver is driving towards the junction and two road segments the driver can take to continue his/her travel after the junction. One of the latter two road segments is an exit to the highway the driver is driving on. For the purpose of this specification, a "road segment" may be defined as a portion of a road that has a starting point and an end point. Most "road segments" will start at some junction and end at an other junction.

As shown, the driver drives on a road segment with three lanes. It is to be understood that a "lane" is defined here as that part of a road having a width that is marked by separate lane markings on the road and which width is intended to be used by one vehicle only. One of the lanes, i.e., the right one forms a separate road segment and is an exit that leads a driver to a direction indicated with a first signpost CERGY—PONTOISE, FRANCONVILLE—EPINIE GUYON whereas the two left lanes form another road segment leading the driver to a direction indicated with a second signpost PARIS, EPINAY S/SEINE, ARGENTEUIL. In reality, the first signpost will be supported by a supporting structure, for instance made of metal posts and beams, such that it is located above the right lane whereas the second signpost will be supported by a supporting structure such that it is located above the two left lanes. Other supporting structures are, of course, possible.

However, the navigation system of the prior art as used for the display of FIGS. 3a and 3b is arranged to display only the first signpost with the indication CERGY—PONTOISE, FRANCONVILLE—EPINIE GUYON above the right lane and to leave out the other signpost if the navigation system has calculated a route for the driver in which the driver is directed to take the right lane to his destination (FIG. 3a). Similarly, the navigation system according to the prior art will display only the second signpost with the indication PARIS, EPINAY S/SEINE, ARGENTEUIL above the two left lanes and leave out the other signpost if the navigation system has calculated a route for the driver in which the driver is directed to take one of the left lanes to his destination (FIG. 3b). In the situation of FIG. 3a, the driver may be further aided by the navigation system by showing an arrow superimposed on the right lane and optionally by a voice instruction indicating the driver to keep right. In the situation of FIG. 3b, the navigation system may superimpose an arrow on the two left lanes and generate a voice instruction indicating the driver to keep left.

However, since the situation of the junction as shown to the driver on the display does not match reality completely, the driver may get confused and may loose his attention for the real-time environment on the road possibly resulting in making an improper decision or placing himself in a dangerous situation.

FIGS. 4a-4d show how the present invention improves the solution of the prior art.

Figure 4A:
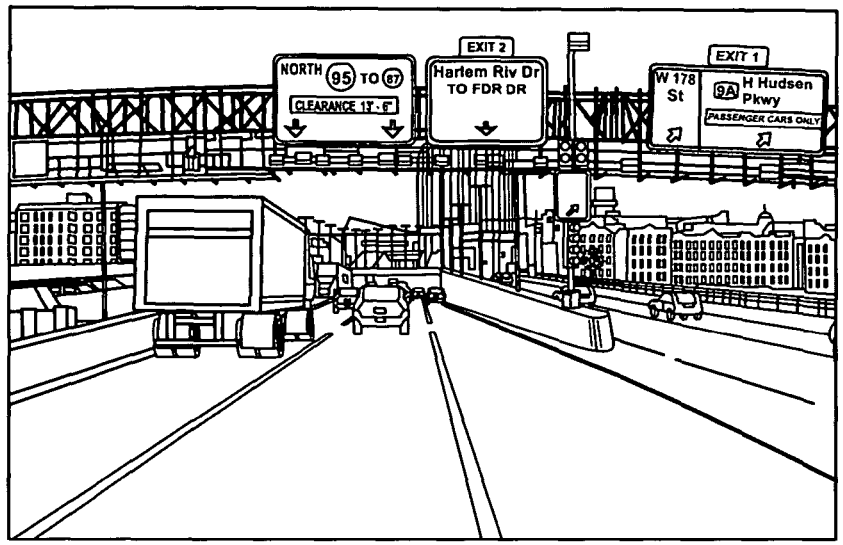
FIG. 4a shows a picture of a complex junction.

FIG. 4a shows a picture of real-life complex junction. A highway shown has two exits, EXIT 1 and EXIT 2. The highway has five lanes:

The two left lanes continue the highway to NORTH 95 to 87, as indicated on a separate first signpost. The sign includes a further advisory (CLEARANCE 13'-6") that indicates that the upcoming stretch of road has limited height clearance to the height specified in feet and inches.

EXIT 2 relates to the middle lane which leads the driver to Harlem Riv Dr, to FDR DR as indicated on a separate second signpost.

EXIT 1 relates to the two right lanes having a separate third signpost where the most right lane corresponds to an indication 9A H Hudson, Pkwy, with a further restriction of PASSENGER CARS ONLY. The left partition of this third signpost directly over and corresponding to the next-to-most right lane corresponds to an indication W 178, St. Such an indication is informing the driver that if he follows that lane he should be moving along a path that will take him to the indicated place.

Figure 4B:
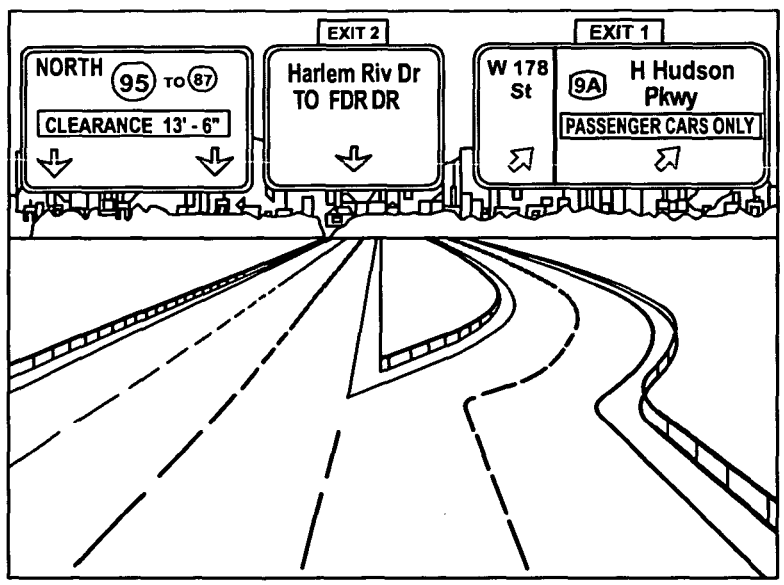
FIG. 4b shows a display in accordance with FIG. 4a, FIGS. 4c and 4h show displays of the picture of FIG. 4a in accordance with the invention.

The situation of the picture of the real-life complex junction as shown in FIG. 4a could be shown on the display 18 of the navigation system as shown in FIG. 4b. However, then, the display shown in FIG. 4b would only help the driver in the sense that he understands that the navigation system is "on track", i.e., knows exactly where he is.

In accordance with the present invention, the navigation system, however, does present all signposts of the real world as are also visible to the driver in reality through his/her windscreen but displays them to the driver in a way such that his/her attention is drawn to that signpost that corresponds with the direction the driver has to take in accordance with the route calculated by the navigation system from the starting point to the destination as received from the driver.

Below the invention will be explained in more detail with reference to FIGS. 4c-4h. In these figures, an embodiment is used where the display shows road segments with their individual lanes. However, the invention is not limited to such an embodiment. The display may only display road segments on a courser level without separate lanes where only one arrow on one road segment is used to show the direction the user has to follow.

Figure 4C:
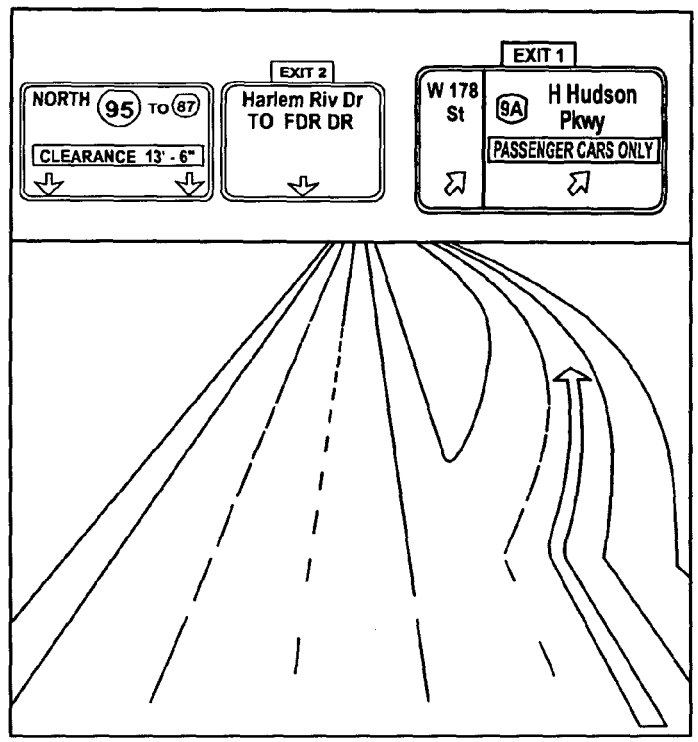

FIG. 4c shows the situation that the driver has to keep right because he has to take EXIT 1 relating to either the direction 9A H Hudson, Pkwy, or the direction W 178, St. In that situation the third signpost as shown on the display 18 is highlighted relative to the other two (i.e., first and second) signposts. But in accordance with the invention the other two signposts are still visible such that the driver directly recognizes the real-life situation and, moreover, directly knows which one of the three signposts he has to follow. Optionally, the navigation system will generate a voice instruction for the driver indicating to him to keep right.

By highlighting the signpost to be followed by the driver, the driver only needs a quick look at display 18 to recognize which signpost he/she should look for in the real life environment as visible through his/her windscreen. Especially at highways, where driving speeds may be very high and traffic may be heavy and dynamic, this is of great help to drivers and may result in fewer piloting mistakes and a safer situation.

The display 18 may also show an arrow indicating to the driver which road segment and lane he/she has to follow on his/her route to his/her destination. As indicated in FIG. 4c, the arrow is shown in the road segment relating to the most right highlighted signpost. Moreover, as also shown in FIG. 4c, the arrow indicating the road segment to be taken is placed in the most right lane showing the driver that this most right lane is the preferred lane on the calculated route. I.e., further down the road, the route as calculated and which the driver has to take, will turn off right again. If the route had been directing the driver to head towards W178 St, then the most right signpost would again be highlighted but the arrow (if shown) would be placed in the next to most right lane.

In reality, the signposts have a background color. For instance, in many countries in Europe most signposts have a blue background color. Some of the indications may be presented against a different background color. For instance, the indication "Clearance 13'-6'"" may have a yellow background color. In one embodiment, the navigation system is arranged to present the signposts with at least the same background color on display 18 as is present on the real-life signposts. This is especially advantageous since colors have turned out to be very eye-catching and may assist in an easy and quick pattern recognition by the user of the navigation system when he/she has to match the display image with the real-life view through his/her windscreen.

Preferably, the text as shown on the display 18 is exactly the same as in reality. But this need not necessarily be the case even though it assists the user in matching the displayed information with reality. In an embodiment, the navigation system does not show the inscription of all the signposts in a legible way.

Alternatively, the navigation system may be arranged to show only a reduced portion of the inscription on the signpost on the display 18.

Figure 4D:
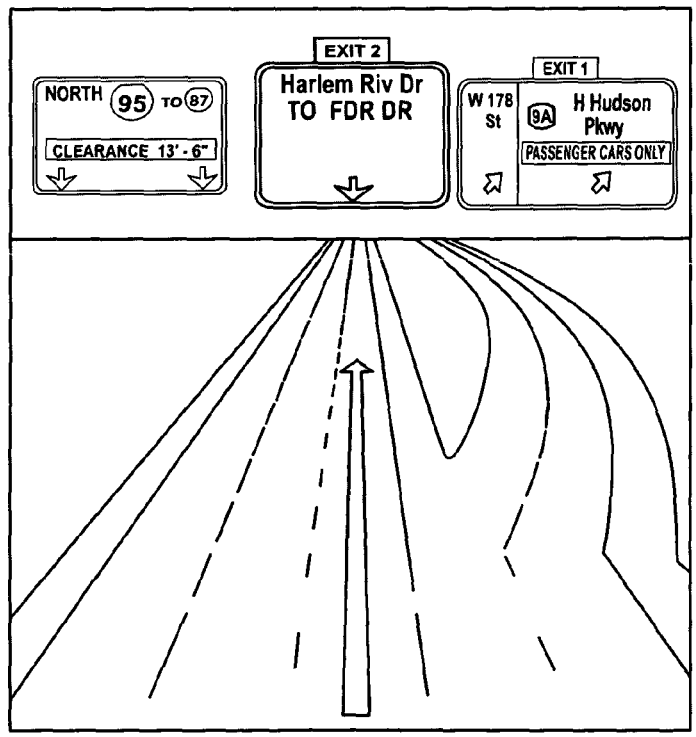

FIG. 4d shows the situation that the driver has to go straight ahead because he has to take EXIT 2 to Harlem Riv Dr, to FDR DR. If so, the second signposts will be highlighted relative to the first and third signposts. Again, the first and third signposts will, thus, still be shown. But it will be directly evident to the driver that he has to go straight ahead which corresponds with the second (middle) signpost. Optionally, the navigation system will generate a voice instruction for the driver indicating to him to go straight ahead.

The navigation system may be arranged to show an arrow on the road segment corresponding to the direction the driver has to take towards the destination of the route. In an embodiment, as shown in FIG. 4d, the arrow is located in the only lane which corresponds with the signpost the driver has to follow, i.e., the second signpost.

In both situations shown in FIGS. 4c and 4d, the signpost to be followed by the driver is highlighted relative to all other signposts on the junction. "Highlighting" is to be understood to present the signpost to be followed by the driver in another way than the other signposts on the display 18. Such other ways may include: flashing that signpost, presenting it in a clearly distinguishable color or displaying that signpost bigger than the others. As a further alternative, the signpost to be followed by the driver may be presented in its normal way whereas the other signposts will be shown in a dulled way, e.g., by showing them in a semi-transparent way superimposed on the rest of the environment of the junction or by showing them with less contrast, or smaller or darker or blurred or by imposing any one or several of a number of visual effects known to those skilled in the art.

Of course, the junction view may show other (animated) objects as present in reality on the junction or as visible on the horizon when approaching the junction, like trees and buildings.

As a further improvement, the navigation system may not only highlight the signpost to be followed by the driver on the display 18 relative to the other signposts but may also highlight the one or more lanes the driver can take on the display 18 relative to the other lanes on the junction. Here again, "highlighting" is to be understood to include any way to clearly distinguish the lanes the driver may take from the other lanes, including providing more emphasis on the one or more lanes the driver may take or blurring or reducing the contrast of the other lanes the driver should not take. Such highlighting of the lane the driver has to take is especially advantageous in cases where the display 18 shows the signposts on a relatively enlarged scale in order to enhance readability but which possibly results in a reduced alignment of which signpost goes together with which lane.

Highlighting the lane(s) to be taken by the driver can be performed in many different ways. This will be explained with reference to FIGS. 4e-4h. All these figures relate to the case where the driver has to take the direction "NORTH 95-87" which corresponds to the first signpost on the left hand side. The embodiments of these figures have in common that they show linking information between the highlighted signpost and the lane(s) going together with that highlighted signpost.

Figure 4E:
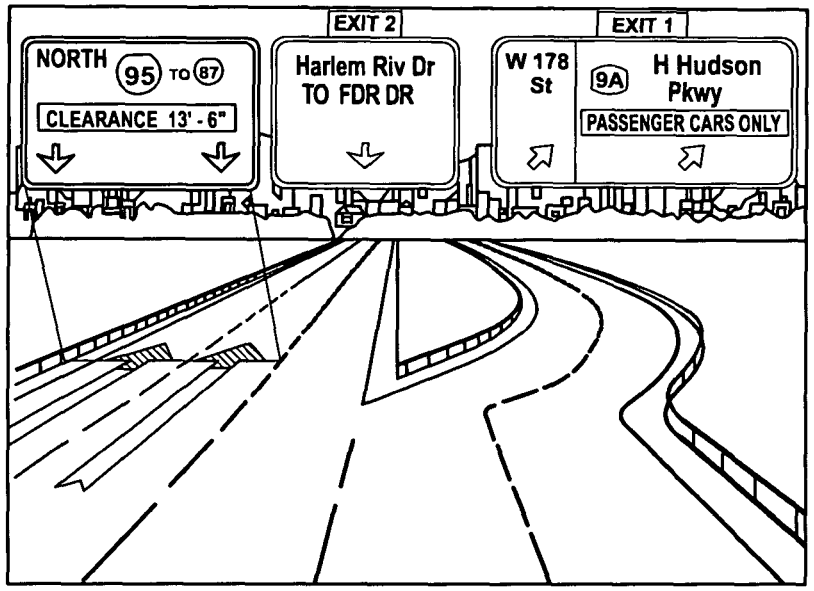

FIG. 4e shows that the most left signpost, to which the driver should pay his attention, is highlighted compared to the other two signposts by presenting the most left signpost as clear as possible and the other two signposts in a dulled way. Moreover, the navigation system is arranged to present linking information on the display 18 showing to the driver which lane(s) goes together with which highlighted signpost. In FIG. 4e, this linking information is an area in the form of a quadrangle which connects the left signpost with the lane(s) that the driver should take in accordance with the calculated route and which internally shows the picture as clear as possible whereas the rest of the picture on display 18 outside this area is shown in a dulled way. Instead of or in addition to showing the internal part of this quadrangle as clear as possible, the edges of this quadrangle can be emphasized, for instance by drawing them as dotted lines.

Figure 4F:
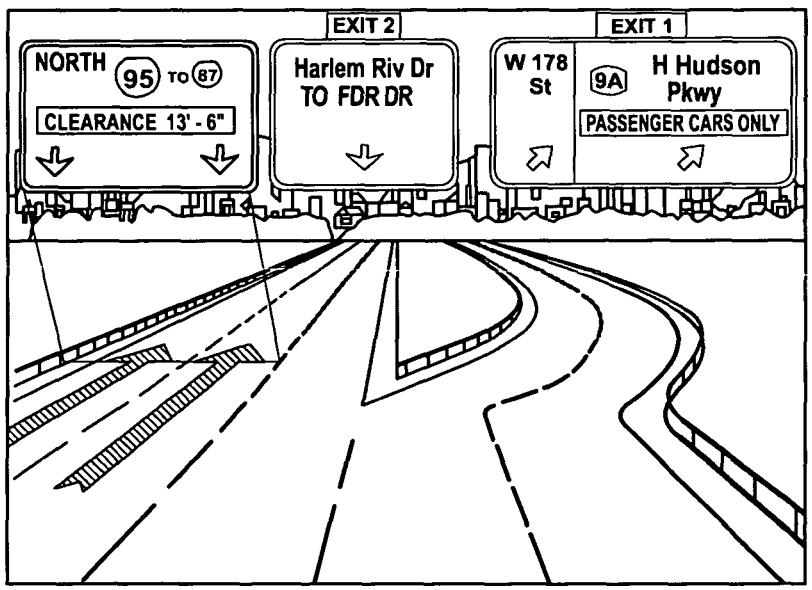

FIG. 4f shows an alternative to FIG. 4e. In the embodiment of FIG. 4f, not only the left signpost and the quadrangle of the picture are highlighted but also the complete two lanes that go together with the left signpost are highlighted.

Figure 4G:
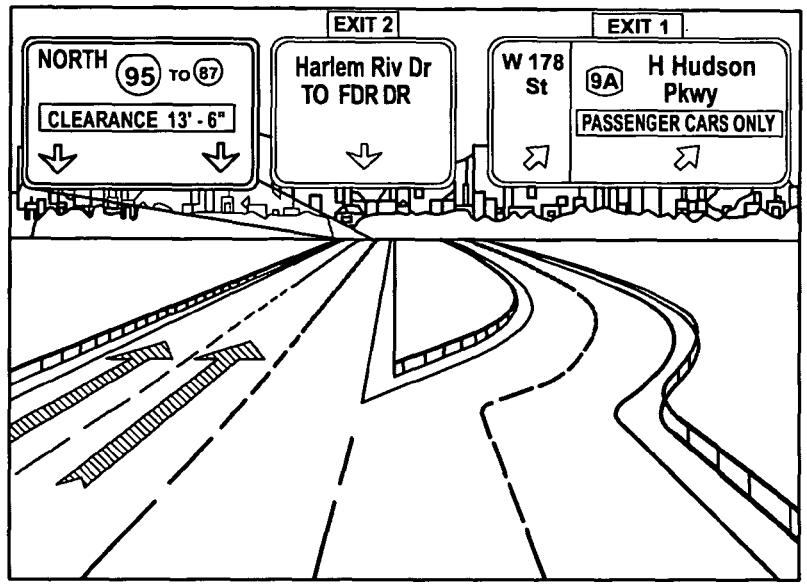

FIG. 4g shows an alternative to the embodiment of FIG. 4e. FIG. 4e shows the quadrangle with highlighted internal surface having one edge coinciding with a line piece spanning the width of the two lanes going together with the left signpost somewhere between the point of view of where the picture has been taken and the horizon. In the embodiment of FIG. 4f, however, this line piece coincides with the horizon of the road as shown in the picture.

FIG. 4g shows an alternative to the embodiment of FIG. 4e. In FIG. 4g the highlighting connecting the sign with the appropriate lanes is linked to where along the horizon the appropriate lanes meet it.

Figure 4H:
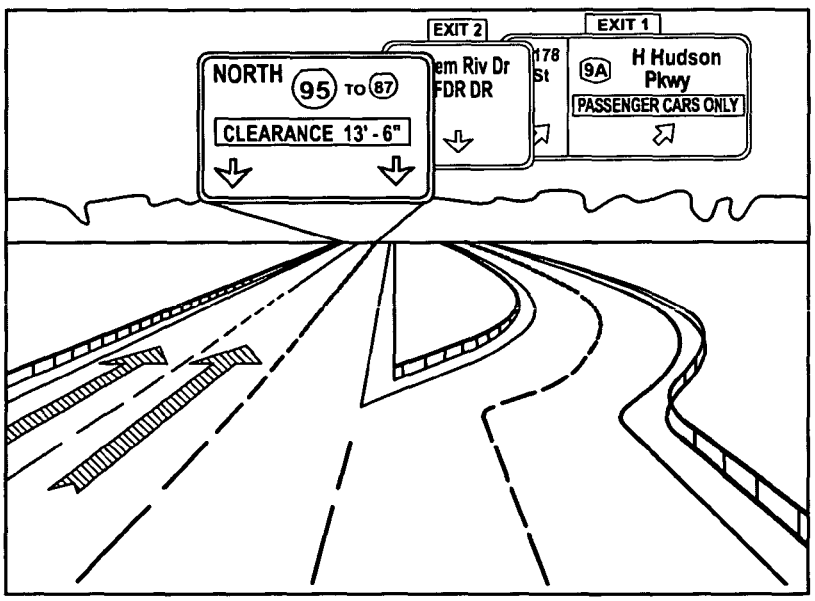

In FIG. 4h, the left signpost that is to be emphasized is not only highlighted but also shown partly in front of the two other signposts. The signposts that are not highlighted can be shown smaller than the one that is highlighted.

This may be supported by a voice instruction generated by the navigation system. For instance, when in the situation of FIGS. 4a-4d, the driver should follow the signpost EXIT 1 relating to either the direction 9A H Hudson, Pkwy, or the direction W 178, the navigation system may generate a voice instruction like: "Please, take one of the two right hand lanes".

Such a voice instruction may also include a repetition of the text as shown on the signpost to be followed by the driver, like: "Please, follow the signpost indicating 9A H Hudson, Pkwy". This may be improved by also indicating the location of the signposts the driver has to follow: "Please, follow the right hand signpost indicating 9A H Hudson, Pkwy,"

The navigation system may, in a further embodiment, be so accurate as to its position measurement that it knows in which lane the car is driving. If so, the navigation system may be designed such that it informs the car driver how many lanes he/she has to shift leftward or rightward to arrive at the correct lane. Such an instruction as generated by the navigation system may, for instance, be: "You are now driving in the middle lane of five lanes. Please, shift two lanes to the right to arrive at the most right hand lane." Alternatively, the navigation system may simply detect that the car is not driving in the most right hand lane and generates an instruction like: "Please, shift lanes to the most right hand lane".

Figure 5:
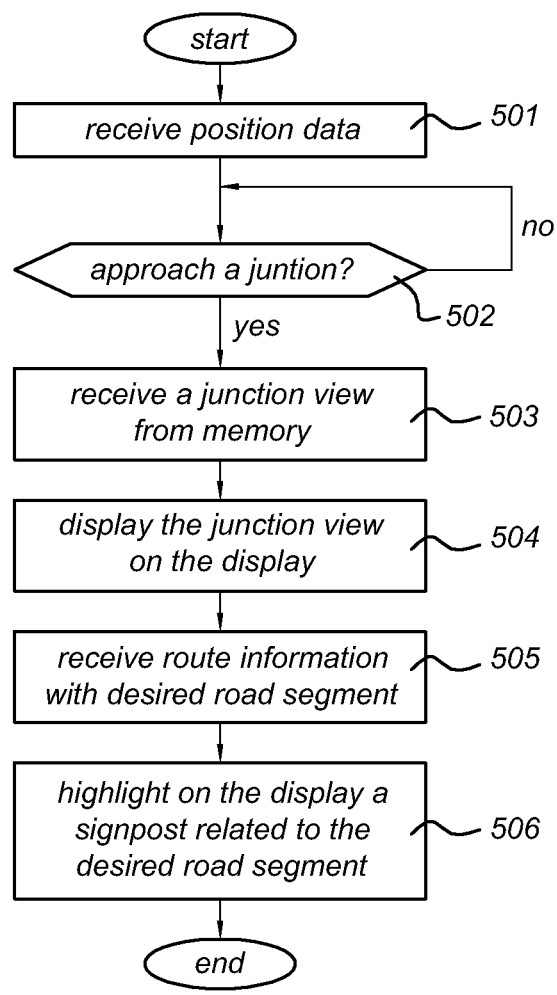
FIG. 5 shows a flow chart in accordance with the invention.

FIG. 5 shows a flow chart of a computer program running on processor 11 of the navigation system in accordance with the invention.

In action 501, the processor 11 receives position data from the position determining device that is arranged to determine the position of the navigation system in the road network.

As indicated in action 502, the processor 11 waits until the vehicle comprising the navigation system approaches a junction. If so, in action 503, the processor 11 obtains a junction view from the set of junction views stored in the memory 12-15. That junction view comprises data as to the real-life view of the junction that the vehicle is approaching. The real-life view comprises road segments connected to the junction as visible to the driver of the vehicle and an image of each signpost present on the junction as visible to the driver. As an alternative to reading the junction view from the set of junction views stored in memory 12-15, the junction view as presented on display 18 may be generated on the fly based on data stored in a map data base. The junction view may be downloaded from a remote memory, for instance a memory connected to a central server controlled by some provider of services. Downloading such a junction view may be controlled by processor 11 as instructed by suitable instructions and data stored in memory 12-15 via network 27. As a further option, a set of junction views generated off board could be downloaded or pushed to the navigation system, upon request, for instance related to the route as set in the navigation system.

In action 504, the processor 11 displays the junction view on display 18 of the navigation system.

In action 505, the processor 11 receives route information from the route planning software indicating a route to be followed by the driver of the vehicle. The route information comprises data as to which road segment connected to the junction is to be followed by the driver on the route.

As indicated in action 506, the processor 11 then highlights on the display 18 the signpost related to the road segment to be followed by the driver relative to all other signposts as shown on the display 18.

It is observed that the actions shown in FIG. 5 need not be performed strictly in the order as presented. If desired another order may be used to meet the needs of the navigation system used. For instance, action 505 need not be performed later in time than action 503 or action 504: action 505 can be performed parallel to action 503.

It is to be understood that the invention is limited by the annexed claims and its technical equivalents only. In the claims, a term like "feature a comprising feature b" is to be interpreted as referring to feature b being part of feature a, whereas also other features may be part of feature a.

The invention claimed is:

1. A navigation system comprising a processor and a display for displaying route information, a position determination device for determining a position of said navigation system in a road network, said processor being connected to a memory storing route planning software arranged to calculate a route to be followed from a starting position to a destination, said memory further storing a computer program comprising instructions and data in order to allow said processor to perform the following actions:
    a. to receive position data from said position determination device;
    b. when approaching a junction on said road network, presenting a junction view on said display, said junction view comprising image data as to a real-life view of said junction, said real-life view comprising road segments connected to said junction as visible to a user of the navigation system approaching said junction and an image of each signpost and associated signpost content present on said junction as visible to said user;
    c. to receive route information from said route planning software indicating said route to be followed by the user of said navigation system, said route information comprising data as to which road segment connected to said junction is to be followed by said user on said route; and
    d. to highlight on said display a signpost and associated signpost content related to said road segment to be followed by said user relative to all other signposts as shown on said display.

2. The navigation system according to claim 1, wherein said junction view is read by said processor from either a memory within said navigation system or downloaded from a remote memory, or is processed on the fly based on data in a map database.

3. The navigation system according to claim 1, wherein the action to highlight said signpost includes at least one of the following sets of actions:
    a. to flash said signpost,
    b. to present said signpost in a distinguishable color,
    c. to display said signpost bigger than other signposts,
    d. to show said signpost partly in front of other signposts, and
    e. to present said signpost in a normal way but to present other signposts in a blurred, semi-transparent, low contrast or darkened way.

4. The navigation system according to claim 1, wherein said computer program is arranged to allow said processor to perform the action to present said junction view inclusive of objects as present in reality or some generalized simulation of such objects, as visible when approaching the junction.

5. The navigation system according to claim 1, wherein said computer program is arranged to allow said processor to perform the action of highlighting on the display one or more lanes of the road segment the user can take relative to other lanes on said junction in accordance with said route.

6. The navigation system according to claim 1, wherein said computer program is arranged to allow said processor to perform any one of the following actions:
    a. to show any inscription on the signpost in a legible way on said display;
    b. to show an inscription of the signpost in an illegible or semi-illegible way on said display;
    c. to show a reduced portion of the inscription on the signpost on the display;
    d. to show the signposts only with their real-life colors, but without any inscription.

7. The navigation system according to claim 1, wherein the navigation system comprises a speaker and said computer program is arranged to allow said processor to perform the action of generating a voice instruction for said user via said speaker indicating which road segment the user is to follow from said junction.

8. The navigation system according to claim 7, wherein said voice instruction includes a repetition of a text as shown on said signpost to be followed by the user.

9. The navigation system according to claim 7, wherein said voice instruction includes a location of the signposts the user has to follow relative to other signposts on said junction view.

10. The navigation system according to claim 7, wherein said voice instruction includes an indication of the lane to be followed by the user.

11. The navigation system according to claim 7, wherein said navigation system is arranged as an in-car navigation system in a vehicle, and said computer program is arranged to allow said processor to perform the action of receiving position data from said position determining device as to a lane in which said vehicle is driving and informing a driver of the vehicle how many lanes said driver has to shift leftward or rightward to arrive at a desired lane according to the route to be followed by the driver.

12. The navigation system according to claim 1, wherein the junction view comprises at least one lane per road segment, each signpost being related to at least one lane, the computer program being arranged to allow said processor to show linking information between the signpost highlighted by the processor and the at least one lane indicated by said highlighted signpost to indicate which lane or lanes of the at least one lane is associated with the signpost.

13. A handheld device comprising a navigation system as claimed in claim 1.

14. A vehicle comprising a navigation system as claimed in claim 1.

15. A method to be performed on a navigation system comprising:
   a. receiving position data from a position determining device arranged to determine a position of said navigation system in a road network;
   b. when approaching a junction in said road network with said navigation system, presenting a junction view on a display of said navigation system, said junction view comprising data as to a real-life view of said junction, said real-life view comprising road segments connected to said junction as visible to a user of said navigation system and an image of each signpost and associated signpost content present at said junction as visible to said user;
   c. receiving route information from route planning software indicating a route to be followed by said user, said route information comprising data as to which road segment connected to said junction is to be followed by said user; and
   d. highlighting on said display a signpost and associated signpost content related to said road segment to be followed by said user relative to all other signposts as shown on said display.

16. A non-transitory computer readable medium comprising a computer program product comprising instructions and data which, when executed by a navigation system, allow said navigation system to perform the method of claim 15.

17. A navigation system comprising: a processor; a display for displaying route information; and a position determination device for determining a position of said navigation system in a road network, said processor being arranged to calculate a route to be followed from a starting position to a destination, and being further arranged to:
   a. receive position data from said position determination device;
   b. when approaching a junction on said road network, present a junction view on said display, said junction view comprising image data corresponding to a real-life view of said junction, said junction view comprising road segments connected to said junction as visible to a user of the navigation system approaching said junction and an image of each signpost present on said junction as visible to said user;
   c. receive route information indicating said route to be followed by the user of said navigation system, said route information comprising data as to which road segment connected to said junction is to be followed by said user on said route; and
   d. present on said display a signpost related to said road segment to be followed by said user in another way to all other signposts as shown on said display, wherein the other signposts are shown in a dulled manner relative to the signpost related to said road segment to be followed.

* * * * *